Sept. 30, 1969  W. J. KUDLATY  3,469,697

FILTER AND BY-PASS VALVE ASSEMBLY

Filed Dec. 14, 1966

INVENTOR.
Walter J. Kudlaty,
BY Parker & Carter
Attorneys.

3,469,697
FILTER AND BY-PASS VALVE ASSEMBLY
Walter J. Kudlaty, Elmhurst, Ill., assignor to Marvel Engineering Company, Chicago, Ill., a corporation of Delaware
Filed Dec. 14, 1966, Ser. No. 601,763
Int. Cl. B01d 27/10
U.S. Cl. 210—132                                            1 Claim

ABSTRACT OF THE DISCLOSURE

A fluid filtering structure having a first filter element for normal filtration, a by-pass valve openable in response to clogging of the first filter element and a second filter element arranged in a replaceable cartridge assembly with the by-pass valve to insure filtration of the by-passing fluid.

---

This invention relates to filters and has particular relation to a filter assembly including means for by-passing filtered fluid.

Filters are known which include a housing, a filter element in the housing and a by-pass valve, wherein fluid is normally passed through the filter element. Upon build-up of deleterious particles on said filter element, the by-pass valve of said known structures opens to deliver fluid directly through the housing to a point of use. In such instances the by-passing fluid, being unfiltered, may have deleterious particles therein. If the clogged condition of the filter element goes unnoticed or remains in effect for any length of time, valuable machinery employing the by-passing fluid is subject to injury and damage. Accordingly, it is one purpose of the invention to provide means insuring delivery of filtered fluid from the filter housing in both the normal and by-pass condition.

Another purpose is to provide a by-pass valve assembly having means for filtering the fluid flowing about the valve of such assembly.

Another purpose is to provide a filtering by-pass valve assembly in cartridge form.

Another purpose is to provide a replaceable filtering by-pass valve assembly.

Another purpose is to provide a filtering by-pass valve assembly of maximum simplicity in construction and maximum economy in manufacture and use.

Figure 1:
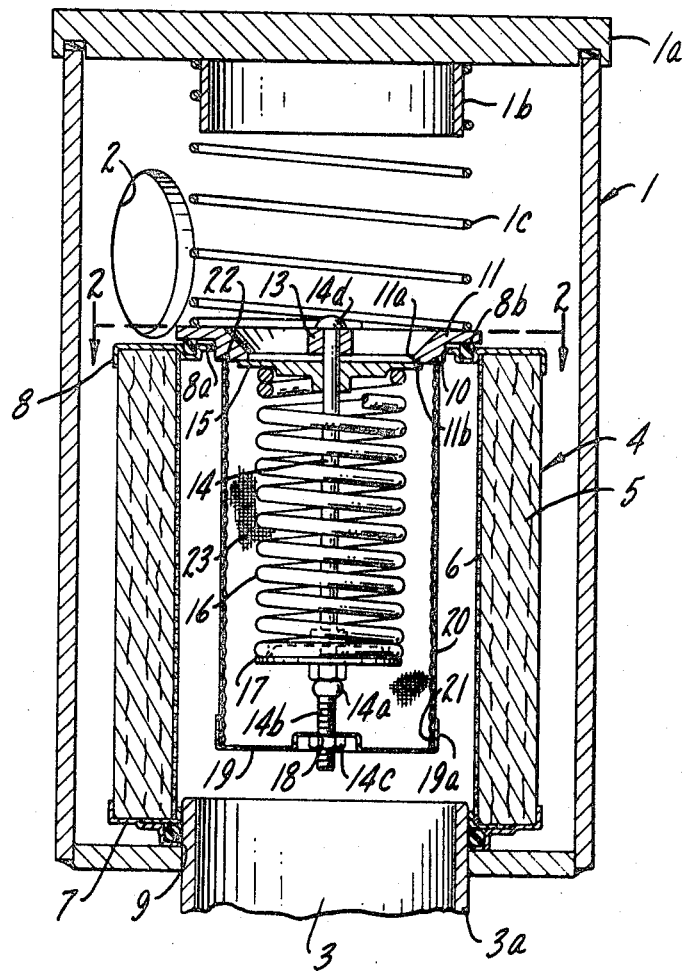
Figure 2:
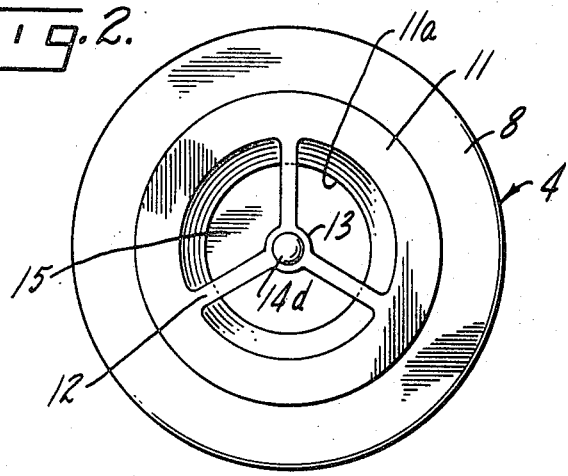

The invention is illustrated more or less diagrammatically in the accompanying drawings, wherein:

FIGURE 1 is a side elevation in partial cross-section; and
FIGURE 2 is a view taken on the line 2—2 of FIGURE 1.

Like parts are indicated by like numerals throughout the specification and drawings.

Referring now to the drawings, the numeral 1 indicates generally a filter housing. The housing 1 has a fluid inlet 2 and a fluid outlet 3. Positioned within the housing 1 is a filter element 4. The element 4 includes an outer filter layer or media 5 which may be, for example, of fine mesh wire and an inner circumferential core 6 which may be, for example, of perforated metal. End plates 7 and 8 are joined to the opposite ends of members 5 and 6 to form the cylindrical filter element 4. Plate 7 has an axial opening 9 to permit outward flow of filtered fluid from the area within the filter element 4 and through the housing sleeve 3a which extends through opening 9 and aids in positioning filter element 4.

Filter element end plate 8 has an annular, inwardly directed flange 8a carrying seal 8b and defining an axial opening 10. Seated against seal 8b on the external surface of flange 8a is a by-pass valve assembly support plate 11.

The plate 11 has a central aperture 11a in which is positioned a web 12. The web 12 centrally carries boss 13 through which a stem 14 extends. Slidable on stem 14 behind boss 13 is a by-pass valve member 15. Member 15 seats against the inner surface of a flange 11b inwardly directed on plate 11 and defining aperture 11a. The valve 15 is urged against said seat, closing aperture 11a, by spring 16, the opposite end of which is retained by spring retainer plate 17. The retainer 17 is positioned on stem 14 by an enlargement 14a formed on the stem 14 beyond retainer 17 from spring 16.

Stem 14 has a rear end segment 14b which extends through a central opening or aperture 18 formed in an end plate 19. The end portion 14b has a threaded segment extending beyond the plate 18 for reception of the nut or fastener 14c in engagement with the external surface of plate 19. The head 14d on stem 14 cooperates with fastener 14c to retain the elements of the by-pass cartridge in assembled configuration.

Plate 19 has a circumferential portion 19a serving to position and retain a first circumferential wall 20, preferably formed of perforated metal. The wall 20 has one of its ends seated in the cup-shaped plate 19, as indicated at 21. The opposite end of circumferential wall 20 engages the rear face of plate 11 as indicated at 22. Within the circumferential wall 20 is a fluid permeable filtering circumferential wall 23, which is engageable against the inner surface of the wall 20 and coextensive therewith and which may be formed of a variety of filtering materials such as fine wire mesh, for example.

The housing 1 includes an end closure plate 1a from the inner surface of which extends a spring positioner sleeve 1b. A spring 1c has one of its ends engaging the inner surface of closure 1a about the sleeve 1b and its opposite end engaging the external surface of plate 11 to position and urge the plate 11 upon the flange 8a and through the mediacy thereof to position and urge the filter element 4 in the desired position shown in FIGURE 1. Thus the spring 1c serves the dual function of removably positioning the by-pass valve assembly 11–23 and the filter element 4.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:
Fluid to be filtered normally enters the housing 1 through an appropriate fluid entry such as that shown at 2. Said fluid then flows within housing 1 externally of filter element 4 and the fluid is forced, having no other path open to it, to flow through the filter media 5 and core 6, from whence the filtered fluid normally flows outwardly through housing outlet 3 to a point of use.

Should the filtering media 5 become clogged with deleterious particles and the resulting pressure within housing 1 externally of filter element 4 thus rise beyond a predetermined level, the valve 15 will be forced open against the action of spring 16 and the unfiltered fluid within housing 1 flows through the aperture 11a. As a result of the present invention, said fluid, having flowed through aperture 11a, is prevented from directly reaching outlet 3 and is forced through filter media 23 and circumferential supporting wall 20. Filtered fluid is thereby delivered to the area within the core 6, precisely as occurred in normal operation, and the thus by-passed and filtered fluid passes through outlet 3, as in normal operation.

During normal operation, filtered fluid passing through media 5 and core 6 is free to flow about, within and through the by-pass valve cartridge assembly without injury thereto and without affect upon the filtered fluid. Should the condition occur in which the by-pass valve 15 is open, deleterious particles retained by filter media wall 23 are retained within the cartridge assembly of the invention and are precluded from passing through outlet 3.

The by-pass valve cartridge assembly comprising elements 11–23, inclusive, may be removed as a unit for cleaning or replacement and may be reinserted by the simple expedient of removing cover 1a and spring 1c and thereafter withdrawing said assembly from the filter element 4. The filter element 4 may, and often will, be removed and cleaned or replaced at the same time.

Should the replacement of filtering wall member 23 be desired, only the removal of fastener nut 14c is necessary. The abutment 14a and head 14d will serve to retain plate 11, valve 15, stem 14, spring 16 and retainer 17 in assembled configuration. With the nut 14c removed, the plate 19 is simply drawn from stem portion 14b, the element 23 is withdrawn from the area within wall 20 and a new filtering wall 23 inserted within wall 20. Thereafter the end cap or plate 19 and nut 14c are replaced, as shown in the drawings, and the by-pass filtering by-pass cartridge assembly 11–23 is ready for reinsertion in a filter element such as that shown at 4.

The assembly of elements 11–23 in unitary or cartridge form provides for ready insertion, removal and replacement thereof with a minimum expenditure of time and effort and by use of simple tools. The cartridge may be substituted in previous filtering structures having only the by-pass valve, stem, spring and spring retainer.

What is claimed is:

1. For use with a hollow cylindrical filter element having an axial opening therethrough, a cartridge assembly including a main plate, said main plate having a flange of greater diameter than the opening in one end of said filter element, and an axial extension receivable in said last-named opening, a circular groove in the inner face of said extension, a hollow cylindrical filter screen having one of its edges seated in said groove and having a diameter less than the diameter of said last named opening, an end plate engaging the opposite edge of said filter screen, a tie rod secured to said main plate and said end plate, means engaging said end plate and threadably engaging said tie rod to clamp said screen between said end plate and said extension, said end plate having a diameter less than said last named opening, a plurality of apertures extending through said main plate and said extension, a valve member slidable on said tie rod within said screen, a retainer on said tie rod within said screen and a spring surrounding said tie rod and having its opposite ends engaging said retainer and said valve member to urge said valve member into engagement with said extension to close said apertures, said cartridge being insertable and removable as a unit from said filter element.

References Cited

UNITED STATES PATENTS

| | | | |
|---|---|---|---|
| 2,617,535 | 11/1952 | Hamilton | 210—132 |
| 3,262,563 | 7/1966 | Pall | 210—443 X |
| 3,314,542 | 4/1967 | Kudlaty | 210—130 |
| 3,370,708 | 2/1968 | Hutgren et al. | 210—130 |

REUBEN FRIEDMAN, Primary Examiner

T. A. GRANGER, Assistant Examiner